(12) United States Patent
Ji et al.

(10) Patent No.: US 10,230,502 B2
(45) Date of Patent: Mar. 12, 2019

(54) HYBRID AUTOMATIC REPEAT REQUEST BUFFER CONFIGURATION

(71) Applicant: QUALCOMM Incorporated, San Diego, CA (US)

(72) Inventors: Tingfang Ji, San Diego, CA (US); Peter Gaal, San Diego, CA (US); Joseph Binamira Soriaga, San Diego, CA (US); Jing Jiang, San Diego, CA (US); Peter Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/853,050

(22) Filed: Dec. 22, 2017

(65) Prior Publication Data
US 2018/0278382 A1 Sep. 27, 2018

Related U.S. Application Data

(60) Provisional application No. 62/476,550, filed on Mar. 24, 2017.

(51) Int. Cl.
H04W 4/00 (2018.01)
H04L 1/18 (2006.01)
H04W 28/04 (2009.01)

(52) U.S. Cl.
CPC .......... H04L 1/1874 (2013.01); H04L 1/1812 (2013.01); H04L 1/1822 (2013.01); H04L 1/1825 (2013.01); H04L 1/1835 (2013.01); H04W 28/04 (2013.01)

(58) Field of Classification Search
CPC ... H04L 1/1812; H04L 1/1822; H04L 1/1825; H04L 1/1835; H04L 1/1874; H04W 28/04; H04W 52/283; H04W 72/0446; H04W 72/048
USPC .................. 370/236, 280, 328, 329; 714/748
See application file for complete search history.

(56) References Cited

U.S. PATENT DOCUMENTS

| 2010/0325503 | A1* | 12/2010 | Womack | H04L 1/1822 714/748 |
| 2013/0070652 | A1 | 3/2013 | Li et al. | |
| 2013/0121216 | A1 | 5/2013 | Chen et al. | |
| 2018/0278374 | A1* | 9/2018 | Zeng | H04L 1/1822 |

OTHER PUBLICATIONS

International Search Report and Written Opinion—PCT/US2018/020481—ISA/EPO dated May 29, 2018.

* cited by examiner

Primary Examiner — Harun Chowdhury
(74) Attorney, Agent, or Firm — Loza & Loza LLP

(57) ABSTRACT

Aspects of the present disclosure provide apparatuses, methods, and processes that can determine the number of concurrent hybrid automatic repeat request (HARQ) processes at a HARQ entity to facilitate efficient use of HARQ buffers and/or resources across different operating modes. An exemplary apparatus is configured to determine a number of HARQ processes based on a number of HARQ buffers, a maximum buffering time, and a slot duration. The apparatus maintains one or more HARQ processes at a HARQ entity up to the determined number of HAR processes and communicate with the one or more other devices utilizing the one or more HARQ processes.

24 Claims, 11 Drawing Sheets

|  | Same Slot | Next Slot | 2 Slots After | 3 Slots After |
|---|---|---|---|---|
| UE1 Category | Supported | Supported | N/A | N/A |
| UE2 Category | Supported w/ Limitations | Supported | Supported | N/A |
| UE3 Category | N/A | Supported w/ Limitations | Supported | Supported |

FIG. 7

HYBRID AUTOMATIC REPEAT REQUEST BUFFER CONFIGURATION

PRIORITY CLAIM

This application claims priority to and the benefit of U.S. provisional patent application No. 62/476,550 filed in the United States Patent and Trademark Office on 24 Mar. 2017, the entire content of which is incorporated herein by reference as if fully set forth below in its entirety and for all applicable purposes.

TECHNICAL FIELD

The technology discussed below relates generally to wireless communication systems, and more particularly, to hybrid automatic repeat request (HARQ) buffer configuration in wireless communication. Embodiments can provide and enable techniques for efficient use of HARQ buffers associated with low latency and mission critical abilities for communications.

INTRODUCTION

Hybrid automatic repeat request (HARQ) is a technique commonly implemented in wireless communication networks to detect and correct error packets in the physical layer (PHY). In general, a receiving device checks received packets for accuracy, and if no error is detected, an acknowledgment (ACK) may be transmitted to the sender. If an error is detected, a negative acknowledgment (NACK) may be transmitted to the sender. In some instances, a receiver may store or buffer received error data and requests a retransmission from the transmitter device.

Retransmissions may be transmitted upon receiving a NACK. A transmitting device (sender) may perform a HARQ retransmission of the packets. Doing so can facilitate various retransmission and decoding techniques such as chase combining, incremental redundancy, etc. For example, when a receiving device receives the re-transmitted data, it may combine it with buffered data prior to channel decoding and error detection. In some networks, for example Long-Term Evolution (LTE) networks, HARQ configuration is typically static, predefined, or not dynamically configurable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide apparatuses, methods, and processes that can determine the number of concurrent hybrid automatic repeat request (HARQ) processes at a HARQ entity to facilitate efficient use of HARQ buffers and/or resources across different operating modes.

One aspect of the present disclosure provides a method of wireless communication. The method determines a number of hybrid automatic repeat request (HARQ) processes based on a number of HARQ buffers, a maximum buffering time, and a slot duration. The method maintains one or more HARQ processes at a HARQ entity up to the determined number, and communicate with one or more devices utilizing the one or more HARQ processes.

Another aspect of the present disclosure provides an apparatus configured to use HARQ processes in wireless communication. The apparatus includes a communication interface configured for wireless communication with one or more devices, a memory, and a processor operatively coupled to the communication interface and memory. The processor and memory are configured to determine a number of HARQ processes based on a number of HARQ buffers, a maximum buffering time, and a slot duration. The processor and memory are further configured to maintain one or more HARQ processes at a HARQ entity up to the determined number, and communicate with the one or more devices utilizing the one or more HARQ processes.

Another aspect of the present disclosure provides an apparatus for wireless communication. The apparatus includes means for determining a number of HARQ processes based on a number of HARQ buffers, a maximum buffering time, and a slot duration. The apparatus further includes means for maintaining one or more HARQ processes at a HARQ entity up to the determined number, and means for communicating with one or more devices utilizing the one or more HARQ processes.

Another aspect of the present disclosure provides a computer-readable storage medium including computer-executable code for causing an apparatus to use HARQ processes in wireless communication. The apparatus determines a number of HARQ processes based on a number of HARQ buffers, a maximum buffering time, and a slot duration. The apparatus maintains one or more HARQ processes at a HARQ entity up to the determined number. The apparatus further communicates with one or more devices utilizing the one or more HARQ processes.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a diagram illustrating exemplary HARQ response capability categories according to some aspects of the disclosure.

DETAILED DESCRIPTION

Figure 1:
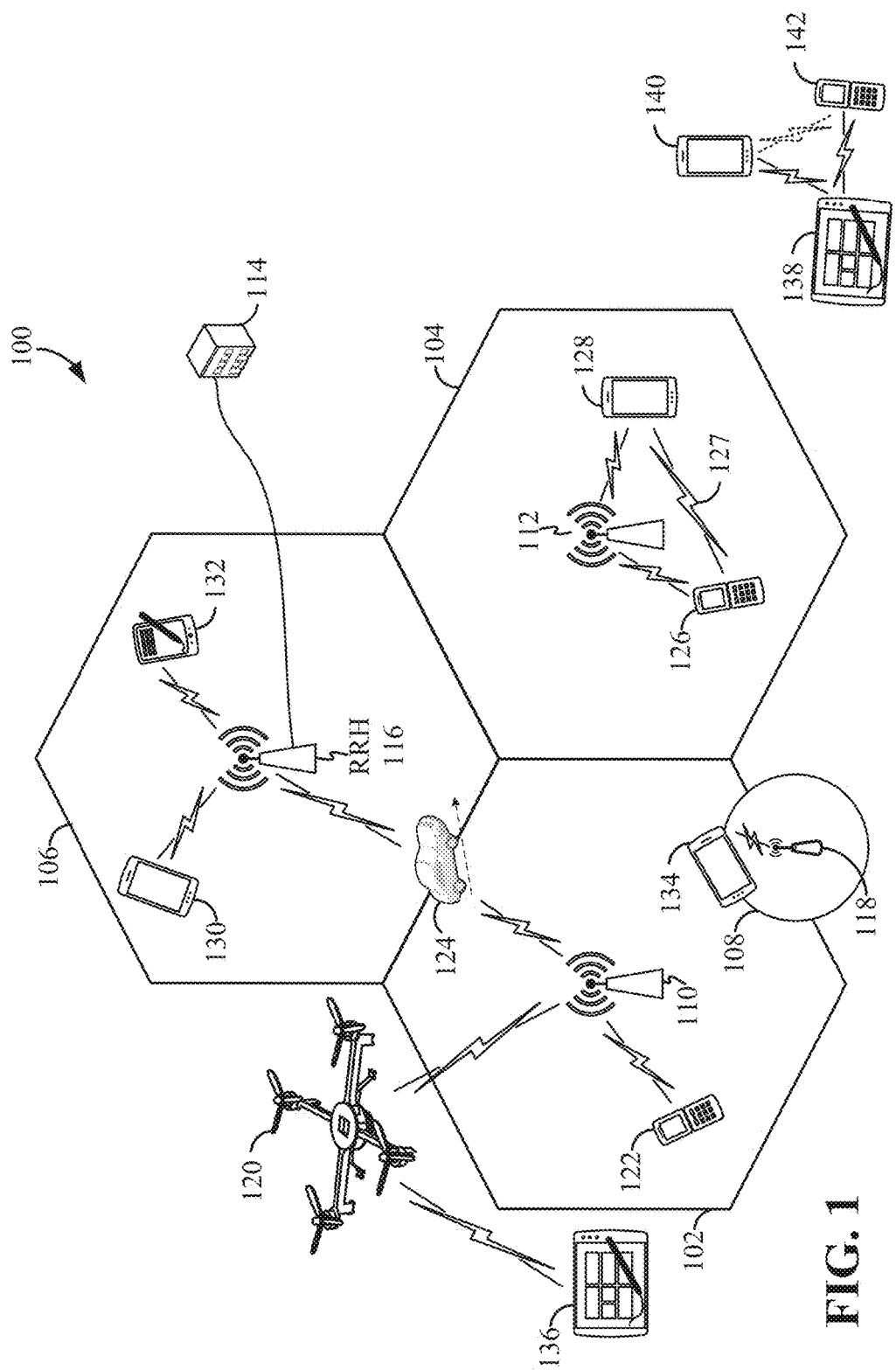
FIG. 1 is a conceptual diagram illustrating an example of a radio access network according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Hybrid automatic repeat request (HARQ) is a technique that can provide robust communication link performance via forward error correction and retransmission of data that is not successfully received in a previous transmission. To that end, the receiver or receiving device determines Log-Likelihood Ratio (LLR) values corresponding to a level of certainty the device has about the determined value of each bit, and stores these LLRs in a buffer (e.g., a soft buffer). If the best guess of the received data, based on these LLRs, results in a failed data integrity check, then the receiving device can request a retransmission of the data. The receiving device can then combine the buffered LLR values from previous transmissions with the LLR data from new transmissions to improve the decoding performance for the received data transmission. LLR data can be used as an input of iterative decoding for powerful error-correcting codes such as low-density parity-check (LDPC) codes, turbo codes, and others. The size of a HARQ buffer may be determined according to, for example, the LLR memory for each slot, the number of slots buffered by a user equipment (UE) for data decoding, and the lowest coding rate.

In one example, a frequency division duplex (FDD) LTE network may implement a 4 millisecond (ms) fixed delay from data transmission of a physical downlink shared channel (PDSCH) to the corresponding HARQ response or feedback. In a time division duplex (TDD) network, HARQ timing may depend on a downlink/uplink slot structure and timing. For example, a PDSCH transmission (downlink) may have a corresponding predetermined uplink slot for its HARQ response after a predetermined delay. In either FDD or TDD example, the HARQ response timing is generally fixed and not dynamic in legacy networks. A HARQ interlacing structure refers to the timing relationship between different transmissions of the same data packet and its acknowledgements (ACK or NACK).

Next generation networks, like 5G New Radio (NR), may support many categories of devices and types of services such as Enhanced Mobile Broadband (eMBB), Ultra-Reliable and Low Latency Communications (URLLC), Massive Machine Type Communications (mMTC), etc. Generally, eMBB services provide improvements to existing broadband wireless communication technologies such as LTE or other legacy technology. Different devices and/or services may have very different requirements in bandwidth, reliability, and latency. For example, eMBB can provide for increased data rates and/or network capacity. In URLLC, reliability refers to the probability of success of transmitting a given number of data bytes within a period or slot (e.g., 1 ms) under a given channel quality. Ultra-reliable refers to a high target reliability, e.g., a packet success rate greater than 99.999%. Latency refers to the time it takes to successfully deliver an application layer packet or message. Low-latency refers to a low target communication latency, e.g., 1 ms or even 0.5 ms (in some examples, a target for eMBB may be 4 ms). mMTC may refer generally to the "Internet of things" (IoT), which brings wireless capabilities to a diverse set of use cases, such as smart sensors, alarms, and automation equipment. Often, mMTC equipment is stationary or low-mobility relative to conventional mobile phones.

Moreover, a 5G NR network can support multiple numerologies that may be utilized by different categories of devices. In wireless communication, a numerology refers to a set of operating parameters deployed in a wireless communication system. Examples of these operating parameters include symbol duration/length, tone/subcarrier spacing, fast Fourier transform (FFT) size, frequency, slot duration, symbols per slot, cyclic prefix (CP) length, and more. One exemplary numerology is orthogonal frequency-division multiplexing (OFDM) operating parameters that define and control how data or information may be transmitted using OFDM radio access technology (RAT). A scaled numerology may have a subcarrier spacing that is a positive integer multiple of a base numerology.

Therefore, different categories of communication devices or services may have different HARQ response capabilities to meet different reliability and/or latency requirements. For example, the HARQ acknowledgment (ACK) or negative acknowledgment (NACK) timeline can vary significantly in different operating modes. Here, an operating mode may refer to a numerology, a category of a device, and/or a combination thereof.

Aspects of the present disclosure provide apparatuses, methods, and processes that can determine the number of concurrent HARQ processes at a HARQ entity to facilitate efficient use of HARQ buffers and/or resources across different operating modes.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
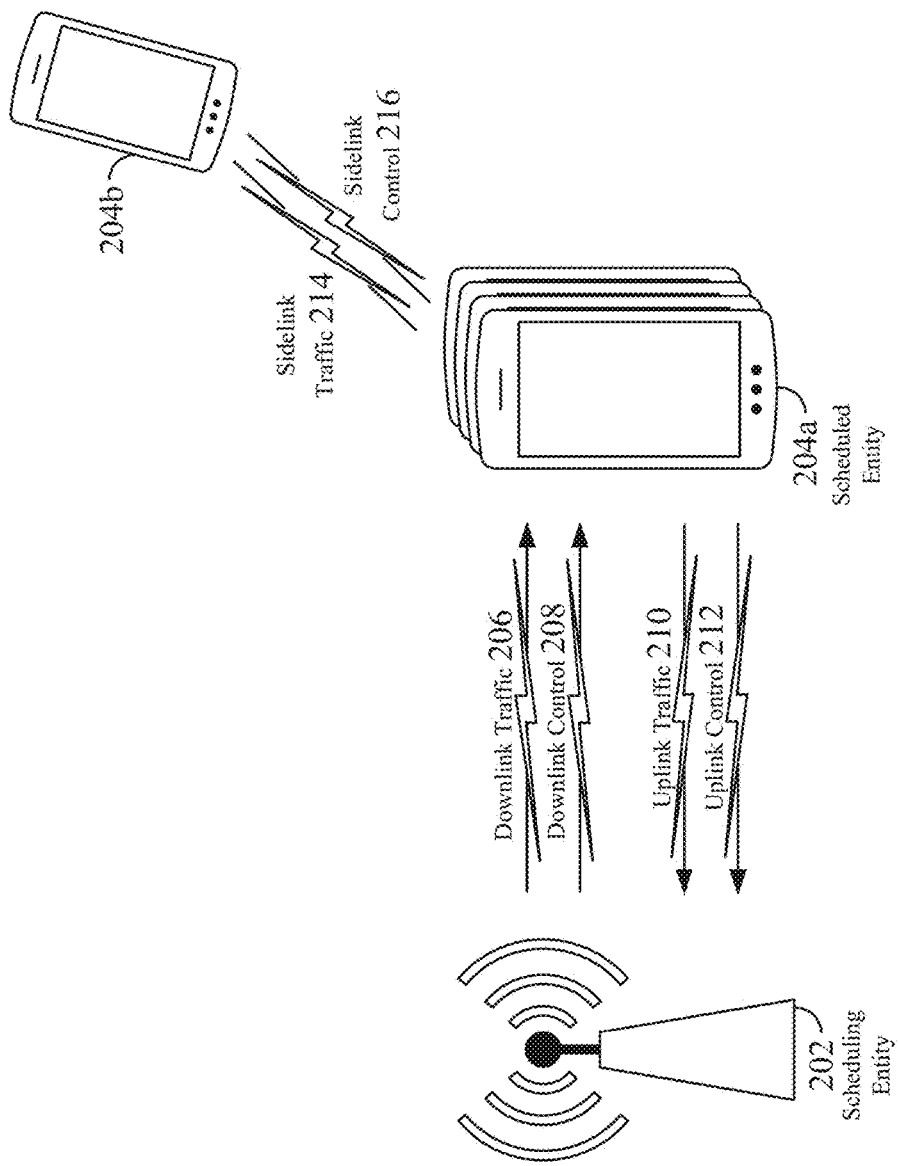
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may transmit or broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Some examples of channel codes that may be used in a 5G NR network include low-density parity check (LDPC) codes, Polar codes, and tail biting convolutional codes (TBCC); however, aspects of the present disclosure may be implemented utilizing any suitable channel code. Various implementations of scheduling entities 202 and scheduled entities 204 may include suitable hardware and capabilities (e.g., an encoder, a decoder, and/or a CODEC) to utilize one or more of these channel codes for wireless communication.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Within the present disclosure and according to some embodiments, use of the term frame generally refers to an instance or period of time associated with how much data is contained within a data unit. Frames can be subdivided into smaller unites (e.g., a subframe). For example, a frame can refer to a duration of 10 ms for wireless transmissions, with each frame consisting of 10 subframes of 1 ms each. On a given carrier, there is one set of frames in the UL, and another set of frames in the DL.

Various aspects of the present disclosure will be described with reference to an OFDM waveform, schematically illustrated in FIG. 3. Yet the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
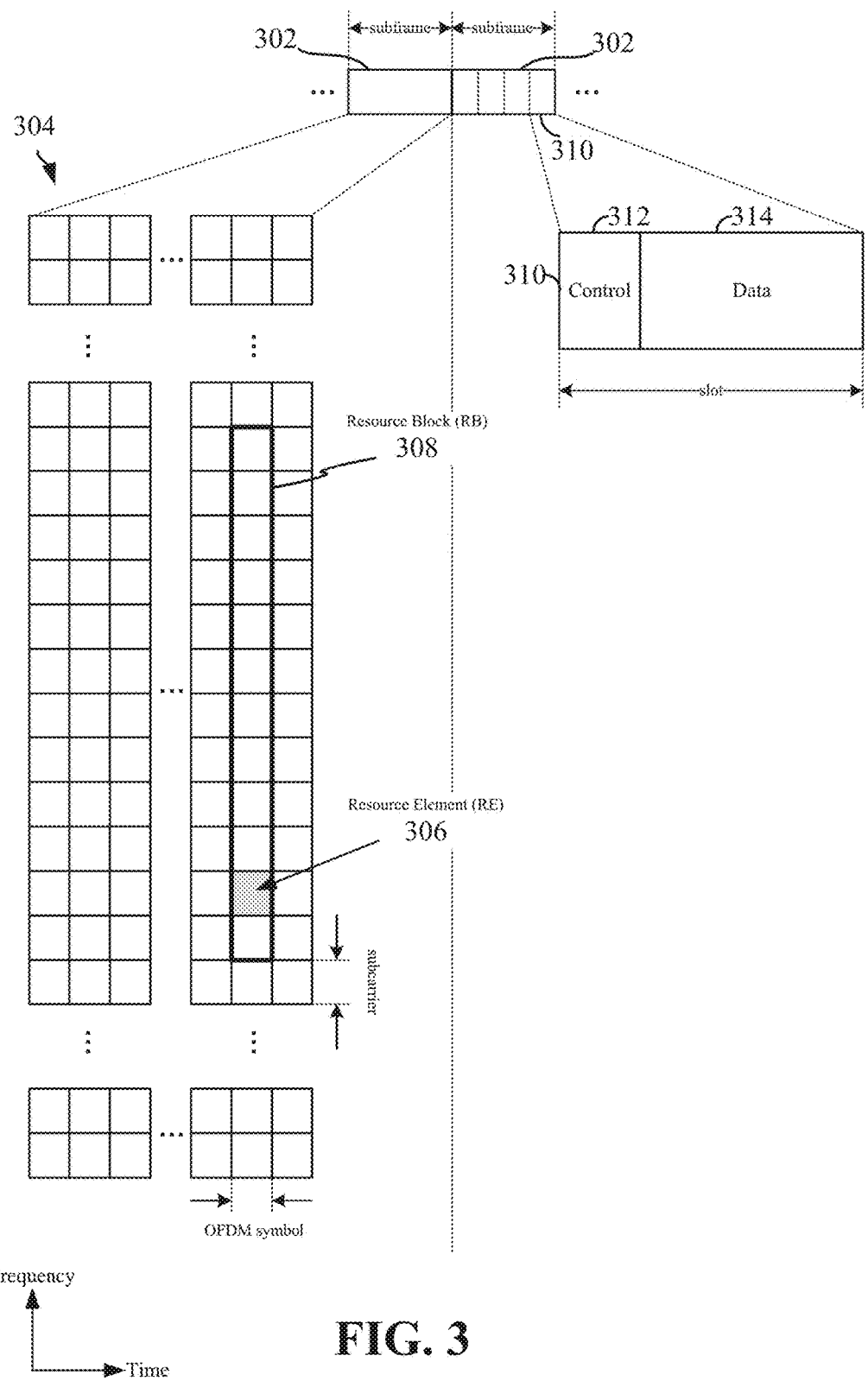
FIG. 3 is a diagram illustrating an orthogonal frequency-division multiplexing (OFDM) waveform according to some aspects of the disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is a small discrete part of a time-frequency grid, and can contain a single complex value representing data from a physical channel or signal. Depending on a modulation utilized in a particular implementation, each RE may represent one or more bits of information. In some examples, a block of REs may be referred to as a physical resource block (PRB) or more simply a resource block (RB) 308. An RB can contain any desired or suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). Mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, a transmitting device (e.g., a scheduling entity 202) may allocate one or more REs 306 (e.g., within a control region 312) to carry DL control information 208. This information can include one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK).

HARQ is a technique enabling checking of packet transmissions at a receiving entity. Accuracy checking can be done utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, a transmitting device (e.g., a scheduled entity 204) may utilize one or more REs 306 to carry UL control information 212. The control information can include one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 2 and 3 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
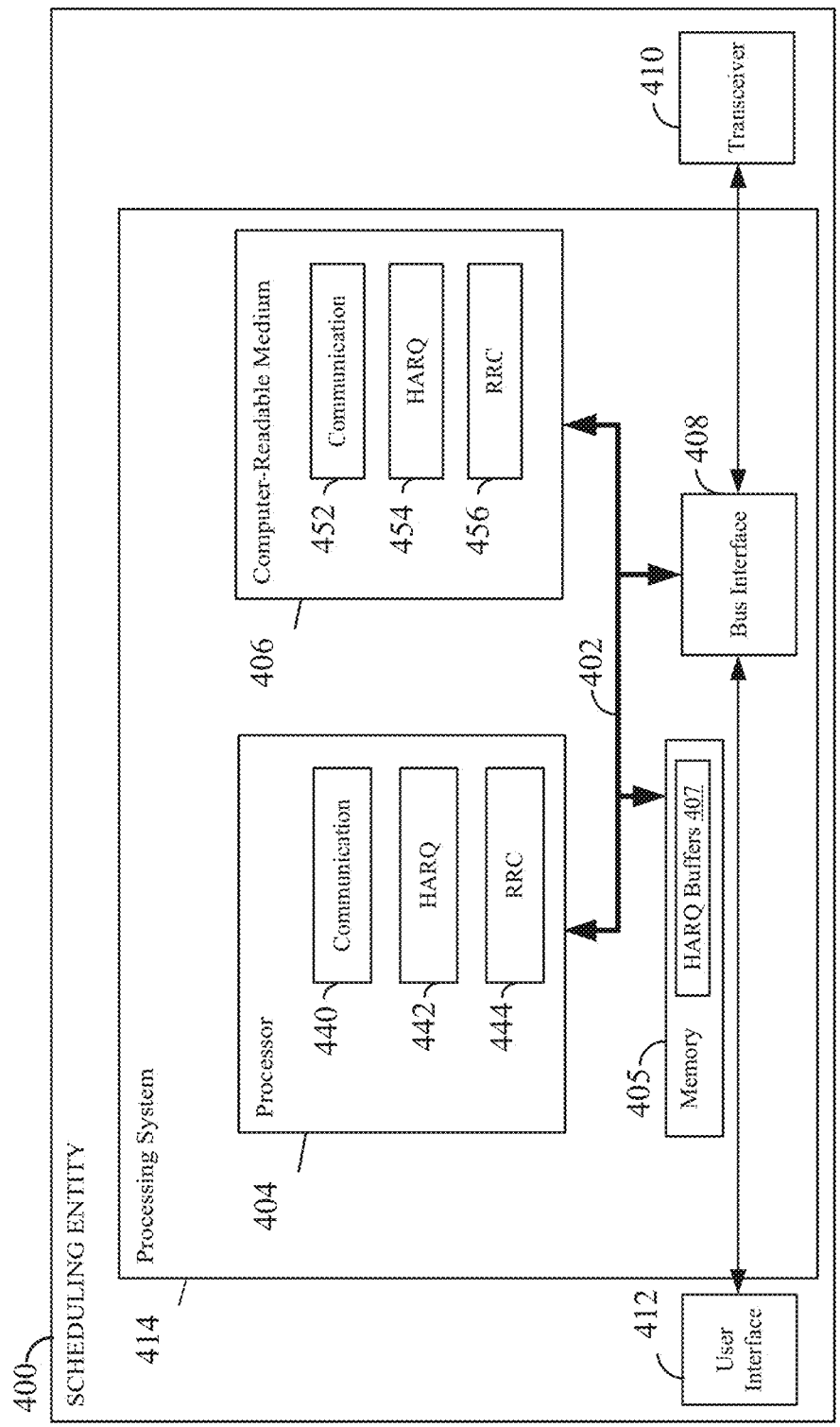
FIG. 4 is a block diagram illustrating an example of a hardware implementation for a scheduling entity employing a processing system according to some aspects of the disclosure.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1 and/or 2. In another example, the scheduling entity 400 may be a base station as illustrated in any one or more of FIGS. 1 and/or 2.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, Qualcomm Snapdragon family of processors, and other suitable hardware configured to perform the various functionality described throughout this disclosure. Processors can contain a variety of physical circuits receiving inputs and providing outputs, and be integrated or distributed arrangements and can be distinguished from or combined with baseband, RF, etc. chips. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 5-11.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick, touchscreen) may also be provided.

In some aspects of the disclosure, the processor 404 may include circuitry configured to implement one or more of the functions and processes described below in relation to FIGS. 6-11. For example, the processor 404 may include a communication block 440, a HARQ block 442, and an RRC block 444. The communication block 440 may be configured to perform various wireless communication functions (e.g., transmitting, encoding, receiving, and decoding control information and user data) utilizing the transceiver 410 or a communication interface. The HARQ block 442 may be configured to perform various HARQ related processes and procedures described for example in relation to FIGS. 6-11. For example, the HARQ block 442 may perform functions involving HARQ feedback, retransmission, and HARQ process and buffer management. The RRC block 444 may be configured to perform various RRC procedures and signaling for configuring and controlling wireless communication between the scheduling entity 400 and other UEs or devices described, for example, HARQ configuration procedures in relation to FIGS. 6-11.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. For example, the memory 405 may include one or more HARQ buffers or soft buffers 407.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
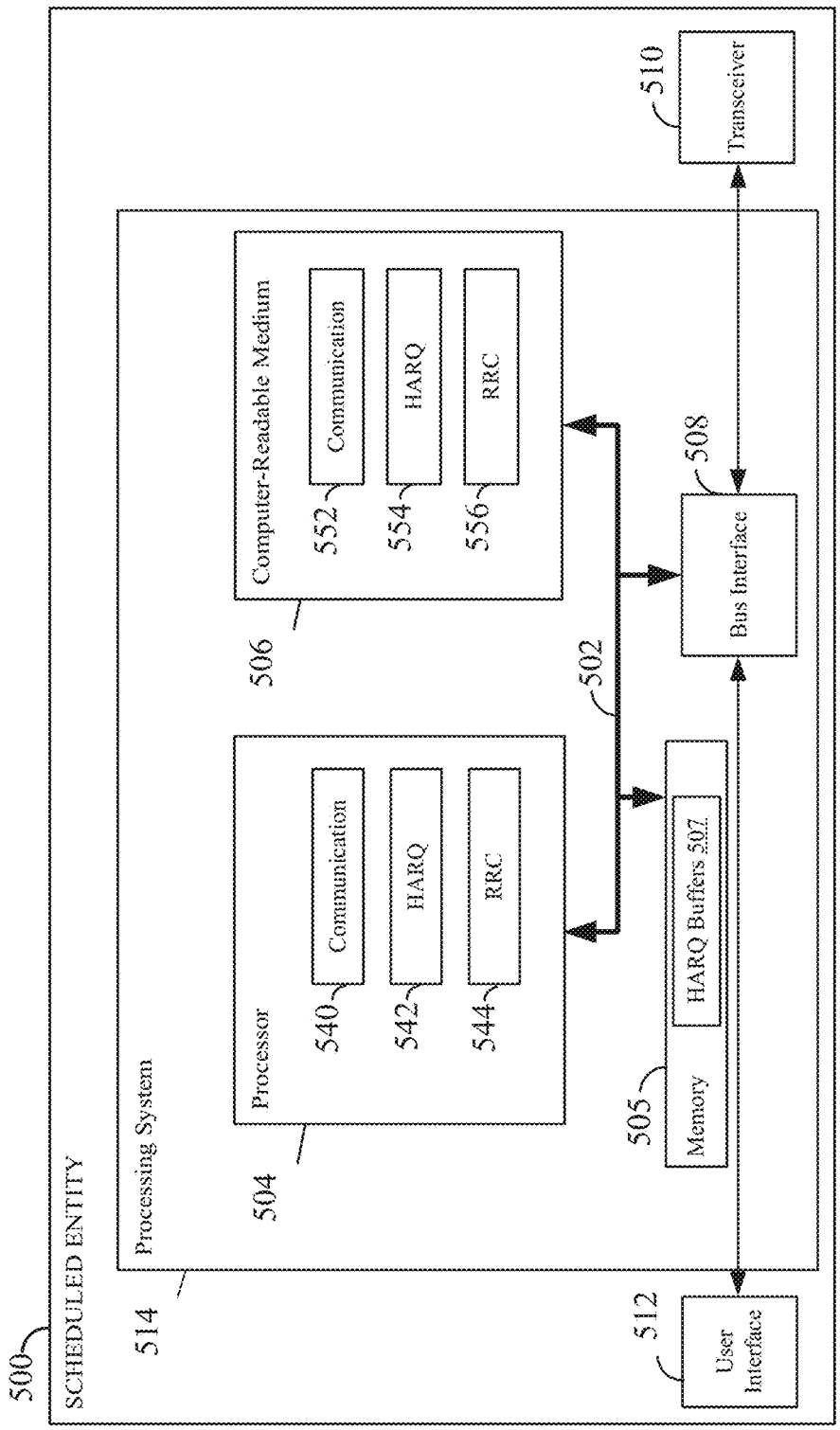
FIG. 5 is a block diagram illustrating an example of a hardware implementation for a scheduled entity employing a processing system according to some aspects of the disclosure.

In one or more examples, the computer-readable storage medium 406 may include software or code configured to implement one or more of the functions or processes described in relation to FIGS. 6-11. For example, the computer-readable storage medium 406 may include communication code 452, HARQ code 454, and RRC code 456. The processor 404 may execute the communication code 452 to perform various wireless communication functions (e.g., encoding, transmitting, receiving, and decoding control information and user data) utilizing, for example, the communication block 440 and transceiver 410. The processor 404 may execute the HARQ code 454, for example using the HARQ block 442, to perform various HARQ processes and procedures described for example in relation to FIGS. 6-11. For example, the HARQ processes and procedures may include functions involving HARQ feedback, retransmission, and HARQ process and buffer management. The processor 404 may execute the RRC code 456 to perform various RRC processes and procedures for configuring and controlling wireless communication between the scheduling entity 400 and other UEs and scheduled entities described, for example, in relation to FIGS. 6-11. FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1 and/or 2.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 (or communication interface) substantially similar to those described above in FIG. 4. That is, the processor 504, as utilized in a scheduled entity 500, may be used to implement any one or more of the processes described below and illustrated in FIGS. 6-11.

In some aspects of the disclosure, the processor 504 may include circuitry configured to implement one or more of the procedures and functions described below in relation to FIGS. 6-11. For example, the processor 504 may include a communication block 540, a HARQ block 542, and an RRC block 544. The communication block 540 may be configured to perform various wireless communication functions (e.g., encoding, transmitting, receiving, and decoding control information and user data) utilizing the transceiver 510 or a communication interface. The HARQ block 542 may be configured to perform various HARQ processes and procedures described for example in relation to FIGS. 6-11. For example, the HARQ block 542 may perform functions involving HARQ feedback, retransmission, and HARQ process and buffer management. The RRC block 544 may be configured to perform various RRC procedures or processes for controlling wireless communication between the scheduled entity 500 and a scheduling entity described, for example, in relation to FIGS. 6-11.

The computer-readable storage medium 506 may include communication code 552, HARQ code 554, and RRC code 556. The processor 504 may execute the communication code 552 to perform various wireless communication functions (e.g., encoding, transmitting, receiving, and decoding control information and user data) utilizing the communication block 540 and transceiver 510. The processor 504 may execute the HARQ code 554 to perform various HARQ processes and procedures described for example in relation to FIGS. 6-11. For example, the HARQ code 554 may include functions involving HARQ feedback, retransmission, and HARQ process and buffer management. The processor 504 may execute the RRC code 556 to perform various RRC procedures for configuring and controlling wireless communication between the scheduled entity 500 and a scheduling entity described, for example, in relation to FIGS. 6-11. The computer-readable medium 506 and the memory 505 may also be used for storing data that is manipulated by the processor 504 when executing software. For example, the memory 505 may include one or more HARQ buffers 507 (e.g., soft buffers).

Figure 6:
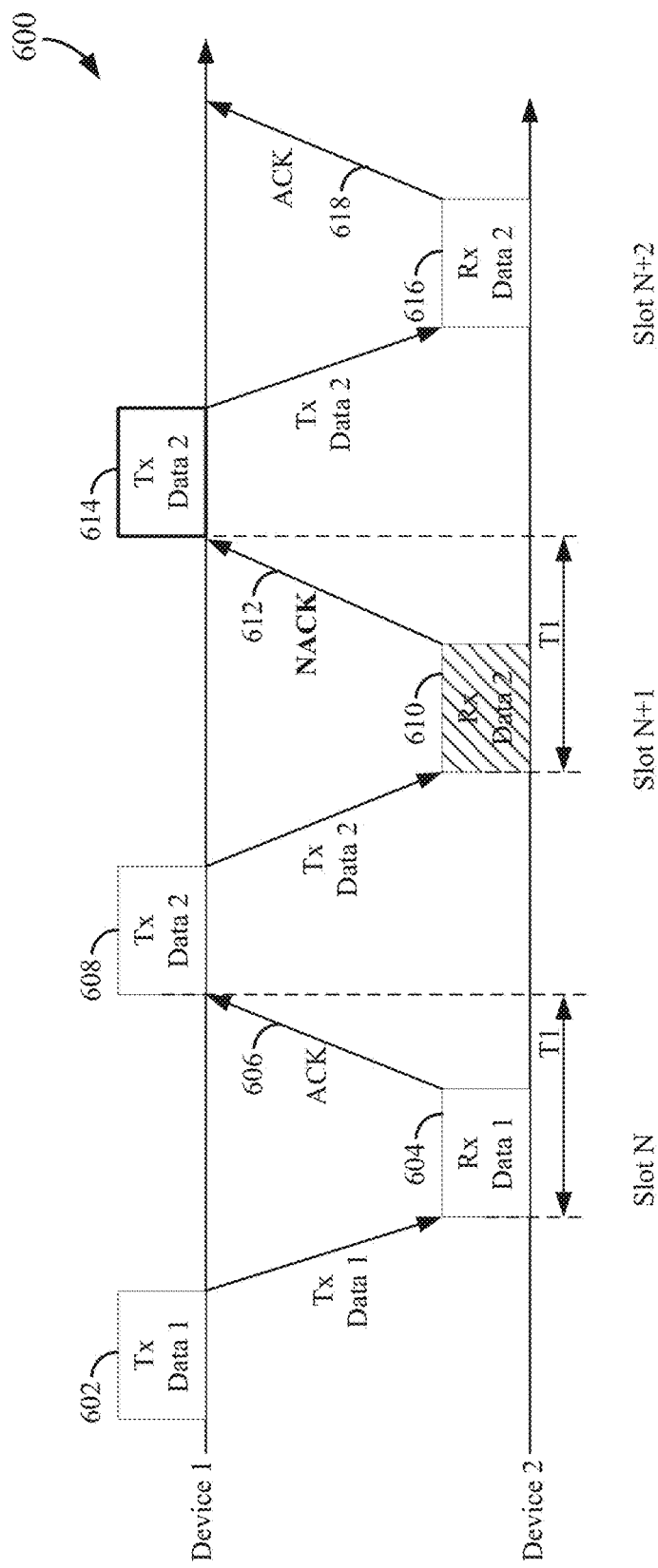
FIG. 6 is a diagram illustrating a hybrid automatic repeat request (HARQ) process according to some aspects of the disclosure.

FIG. 6 is a diagram illustrating an exemplary HARQ process 600 according to some aspects of the disclosure. The HARQ process 600 may be performed by any of the scheduling entities and/or scheduled entities illustrated in FIGS. 1, 2, 4, and/or 5. A transmitting device (e.g., device 1) may transmit a first data packet 602 (Data 1) to a receiving device (e.g., device 2). In some examples, a transmitting device or sender may be a base station or scheduling entity, and a receiving device may be a UE or scheduled entity. In some examples, a first data packet 602 may be a DL data packet (e.g., PDSCH data). To determine if the first data packet was properly received and decoded without data errors, the receiving device may perform an integrity check of the received data packet 604, such as a checksum or a cyclic redundancy check (CRC). If the first data packet 604 is correctly received and/or decoded, the receiving device may transmit a HARQ ACK 606 as feedback to notify the transmitting device. If the first data packet 604 is not correctly received and/or decoded, the receiving device may transmit a HARQ NACK as feedback to notify the transmitting device.

In one example, the time delay (T1) between the reception of data and the transmission of a HARQ feedback (e.g., ACK or NACK) may be within the same slot (e.g., slot N). FIG. 6 illustrates a case in which a HARQ feedback (e.g., ACK 606 and NACK 612) is transmitted in the same slot after reception of a data transmission (e.g., data packet 604).

In another example, the time delay between the reception of data and the transmission of a HARQ feedback (e.g., ACK or NACK) may be longer than one slot. In one example, the HARQ feedback for data received in slot N may occur in the next one or more slots (e.g., slot N+1, slot N+2, etc.).

In the illustrated HARQ process 600, after receiving the ACK 606, the transmitting device (device 1) may transmit a second data packet 608 (Data 2) to the receiving device (device 2). If the second data packet 610 is not successfully received and/or decoded, the receiving device may transmit a NACK 612 to notify the transmitting device. In response to the NACK 612, the transmitting device may retransmit the second data packet (or information corresponding to the data packet) 614. The retransmitted second data packet 614 may, to be combined at the receiving device with the initial transmission of the second data packet (e.g., using chase combining, incremental redundancy, etc.). If the retransmission 616 results in the second data packet being correctly received and decoded, the receiving device may transmit an ACK 618 to notify the transmitting device.

In some aspects of the disclosure, HARQ timing management may consider a UE's capability category. A UE (or scheduled entity) may be categorized into one or more capability categories based on its ability to generate HARQ responses (e.g., ACK or NACK) within a predetermined delay or slot. Three exemplary UE capability categories are illustrated in a table 700 illustrated in FIG. 7. In a UE1 category, a UE is capable of providing a HARQ response or feedback (e.g., ACK or NACK) in the same slot in which the corresponding data transmission is received or next slot. In a UE2 category, a UE is capable of transmitting a HARQ response or feedback in the next one or two slots after receiving the data transmission. In a UE3 category, a UE is capable of transmitting a HARQ response or feedback in the next two or three slots after receiving the data transmission. In some aspects of the disclosure, additional capability categories may be used to categorize the UEs. In some examples, a UE with low mobility may be in the UE1 category, and a UE with high mobility may be in the UE2 or UE3 category. In general, a UE with higher mobility will need more time to transmit a HARQ response, and vice versa. In some examples, a UE may be configured to work in multiple UE capability categories. In some aspects of the disclosure, UEs may be grouped into different capability categories based on their HARQ capabilities that may be different from or in addition to those shown in FIG. 7.

While FIG. 6 illustrates one HARQ process, a device may utilize multiple HARQ processes concurrently. In some aspects of the disclosure, multiple HARQ processes offset in time from each other may be used in wireless communication. Each HARQ process transmits a block of data similar to that illustrated in FIG. 6. For example, LTE may use up to eight HARQ processes for FDD implementation, and ten or more for TDD implementation. For each HARQ process, the receiver may utilize a HARQ buffer (e.g., soft buffer) to buffer the LLRs of the received transmission. The transmitting device explicitly or implicitly informs the receiving device the HARQ process to which the current retransmission belongs, such that the receiving device can process the received data transmission with the correct HARQ process.

Figure 8:
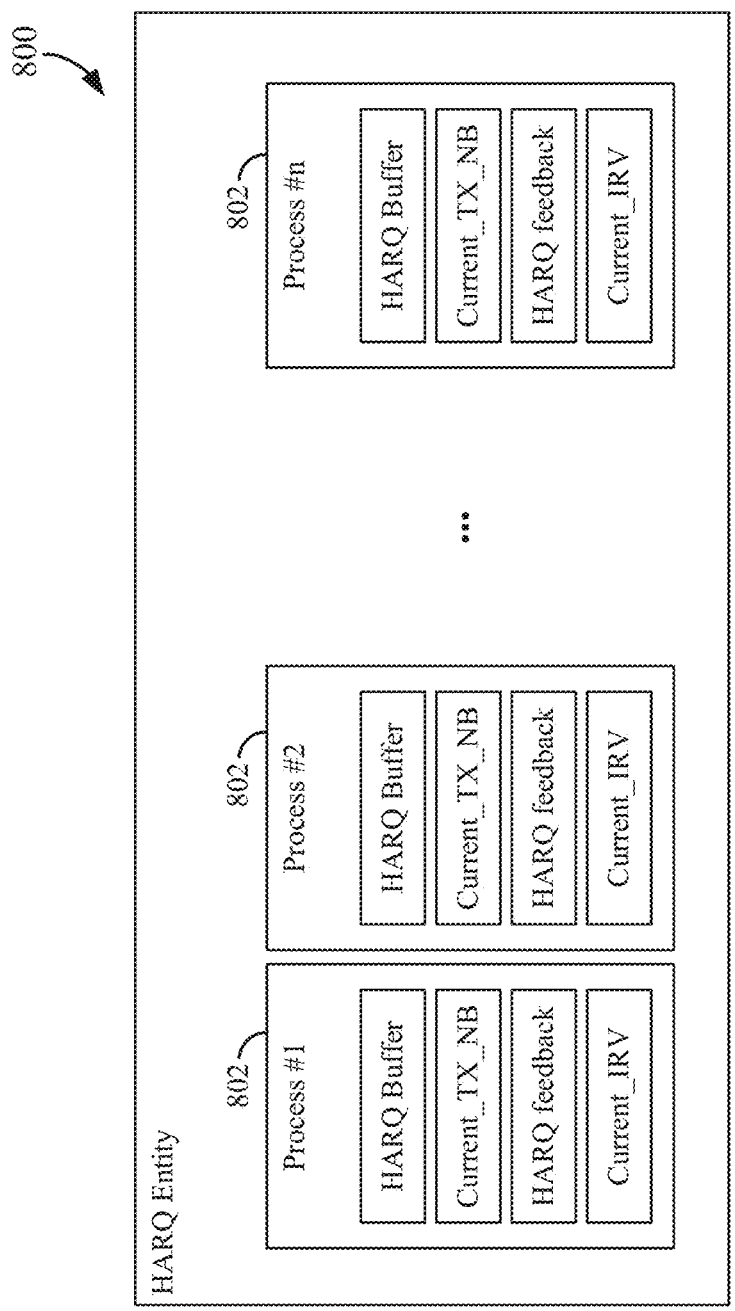
FIG. 8 is a diagram illustrating an exemplary HARQ entity according to some aspects of the disclosure.

FIG. 8 is a diagram illustrating an exemplary HARQ entity 800 according to some aspects of the disclosure. A HARQ entity typically resides in the MAC layer of the transmitter and receiver. When communicating with multiple devices, a separate HARQ entity may be established in the MAC layer for each device. Multiple HARQ processes may be used for the same link between the transmitter and receiver The HARQ entity 800 can perform the HARQ operations at a receiver or transmitter. For example, the HARQ entity 800 may perform HARQ operations including transmission of transport blocks and, if necessary, retransmission of the transport blocks, and, if configured, reception and processing of HARQ ACK/NACK signaling. Moreover, the HARQ entity 800 may perform HARQ operations including reception of transport blocks, combining and decoding of the received transport blocks and, if configured, generation and transmission of HARQ ACK/NACK signaling. The HARQ entity 800 may maintain one or more HARQ processes 802 (e.g., HARQ Process #1, HARQ Process #2, . . . , HARQ Process #n). Every HARQ process maintains a HARQ buffer for storing LLRs corresponding to received data transmissions. The HARQ entity 800 further maintains a buffer for each HARQ process for storing various fields including Current_TX_NB, HARQ feedback, and Current_IRV. Current_TX_NB indicates the number of transmissions that have taken place for the PDU or data currently stored in the HARQ buffer. HARQ feedback stores ACK/NACK received from the receiver. Current_IRV stores the current incremental redundancy version as indicated by the scheduling information.]

In some aspects of the disclosure, a UE may provide a HARQ response according to a variety of timelines or timings. For example, in some scenarios, timing can be different (i.e., advancing or delaying HARQ timing) from the specified or default HARQ response timing of the UE's category with some limitations and constraints. A limitation or constraint is a condition in which one or more operational parameters of the UE do not satisfy or meet a predetermined level or setting. For example, a UE of UE2 category may be configured to provide a HARQ response in the same slot, earlier than its nominal or default timing, with certain limitations or constraints. Similarly, a UE of UE3 category may be configured to provide a HARQ response in the next slot, earlier than its nominal or default timing, with some limitations or constraints.

Other HARQ arrangements and scenarios may also consider other factors. In one example, a UE of UE2 category may transmit a next-slot HARQ response in a default setting, but may be able to provide an earlier same-slot HARQ response by advancing its HARQ timing, for example, when the UE handles lower rank transmissions (e.g., rank 1), limited transport block size (TBS), less complex modulation and coding scheme (MCS), or a constraint condition in which the UE has extra resources that may be allocated to transmit a HARQ response earlier. In general, when a UE has extra available resources (e.g., time, processing power, storage, bandwidth, frequency, etc.), it may be configured to advance its HARQ timing to provide a HARQ response earlier than its default or nominal delay or timing.

Figure 9:
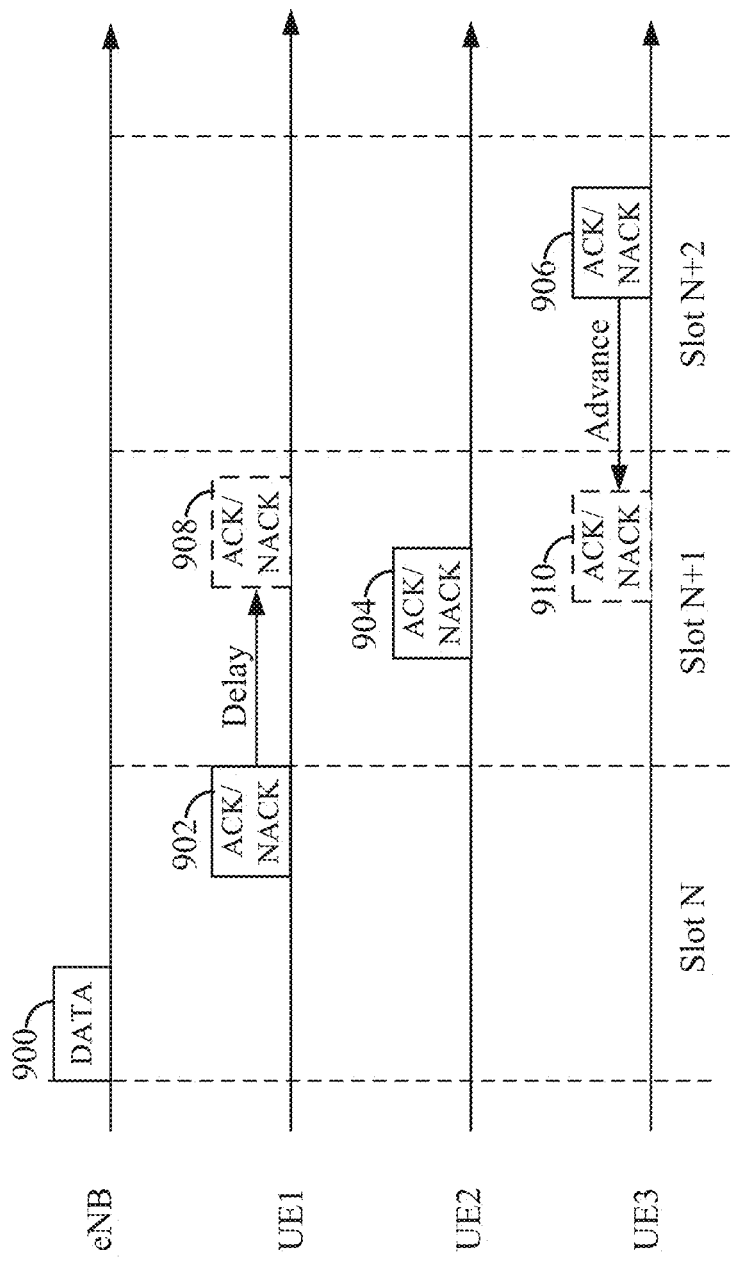
FIG. 9 is a diagram illustrating exemplary HARQ response timings of different UE capability categories according to some aspects of the disclosure.

FIG. 9 is a diagram illustrating some exemplary HARQ responses of different UE capability categories according to some aspects of the disclosure. A scheduling entity (e.g., base station, eNB, or gNB) may transmit data 900 to different scheduled entities (e.g., UE1, UE2, and UE3) in a certain slot N. The data 900 may be transmitted in a DL channel, for example, a PDCCH or a PDSCH. The data 900 may include different data, for example, first DL data destined for a first UE (UE1), second DL data destined for a second UE (UE2), and third DL data destined for a third UE (UE3). The scheduling entity may utilize an RRC block 444 to configure the UEs via RRC signaling to use different HARQ response timing. In response to receiving the data, UE1 may utilize a HARQ block 542 to send a HARQ response 902 (e.g., ACK or NACK) within the same slot N. In response to the received data, UE2 may utilize a HARQ block 542 to send a HARQ response 904 in the next slot (slot N+1) or in a slot after slot N+1 (e.g., slot N+2). In response to the received data, UE3 may utilize a HARQ block 542 to send a HARQ response 906 in the next-next slot (i.e., slot N+2) or in a slot after slot N+2 (not shown in FIG. 9). The particular positions of the data 900 and HARQ responses shown in FIG. 9 are illustrative in nature and not restrictive. The DL data 900 may also include DL control data. For example, DL control data may include PDCCH data (e.g., DCI) for providing one or more parameters or information of the DL transmission. In some aspects of the disclosure, the parameters may include information for configuring the HARQ response timing of the UEs.

In some aspects of the disclosure, a HARQ response may be dynamically advanced or delayed relative to its default or nominal HARQ response timing. That is, for example, that a device may dynamically configure its HARQ response time to be different in different slots. In one example, U1 may be dynamically configured to send a delayed HARQ response 908 in the next available UL transmission opportunity (e.g., slot N+1) as compared to its default or nominal HARQ timing (e.g., slot N). The delay may be within the same slot or extended to a later slot. In another example, a UE3 may be configured to advance its HARQ response 910 in the same slot or to an earlier slot (e.g., slot N+1).

In some examples, the use of a delayed or advanced HARQ response may be indicated by a certain value (e.g., one or more bits in downlink control information (DCI) or uplink control information (UCI)) that is exchanged between the base station and UE for dynamic HARQ timing management. For example, a value of 0 may indicate a same-slot HARQ response, a value of 1 may indicate a delayed HARQ response (e.g., N+1 slot or N+2 slot), and a value of 2 may indicate an advanced HARQ response. The DL control information (e.g., DCI) may include parameters for indicating the amount of delay and/or advance in HARQ response timing. In one example, when the HARQ response is delayed and if the next slot is an all-DL slot, the UE may omit the HARQ response in the next slot due to no UL opportunity. That is, an all-DL slot provides no UL transmission opportunity. In another example, if the next slot is an all-DL slot, the UE may postpone the HARQ response until it finds a slot with an UL transmission opportunity, which may be an implicit way of dynamic ACK/NACK timing signaling. The above-described dynamic HARQ response processes may be applied in HARQ retransmission of UL data from a UE.

According to some embodiments and deployments, devices may have different operating modes and use different numerologies. Different operating modes and numerologies may have different HARQ timelines. A HARQ entity can achieve a potentially higher data rate when more HARQ processes are used concurrently. Yet maintaining more HARQ processes may require more resources like HARQ buffers.

Aspects of the present disclosure provide a method for determining the number of HARQ processes maintained at a HARQ entity 800 to facilitate efficient use of a HARQ buffer in wireless communication. In particular, the method can facilitate more efficient use of HARQ resources (e.g., MCS and RBs) across different operating modes and numerologies. In one aspect of the disclosure, the maximum or optimal number of HARQ processes may be determined by Function (1) set forth below.

$$\text{Min}(N, T\_buffer/T\_slot) \quad \text{Function (1)}$$

In Function (1), N is the number of HARQ buffers utilized by the HARQ entity. T_buffer is the maximum buffering time, and T_slot is the slot duration. The maximum buffering time refers to the maximum time delay between the transmission of data by the transmitter and the transmission of the corresponding HARQ response (e.g., ACK/NACK) by the receiver. According to Function (1), the maximum number of HARQ processes may be determined to be the minimum of N or T_buffer/T_slot.

The number or quantity of HARQ buffers may be determined based on the amount of memory or resources available at the transmitter and/or receiver involved in the HARQ process. The function (1) selects a number of HARQ processes to avoid running out (e.g., buffer overflow) of HARQ buffers during communication.

In some examples, N may be 8, 16, or any predetermined number of HARQ buffers. T_buffer may be 2 ms or 1 ms, and T_slot may be 0.5 ms or 0.125 ms. In one particular example, N is 8, T_buffer is 2 ms, and slot duration is 0.5 ms; therefore, the maximum number of HARQ processes is 4.

Figure 10:
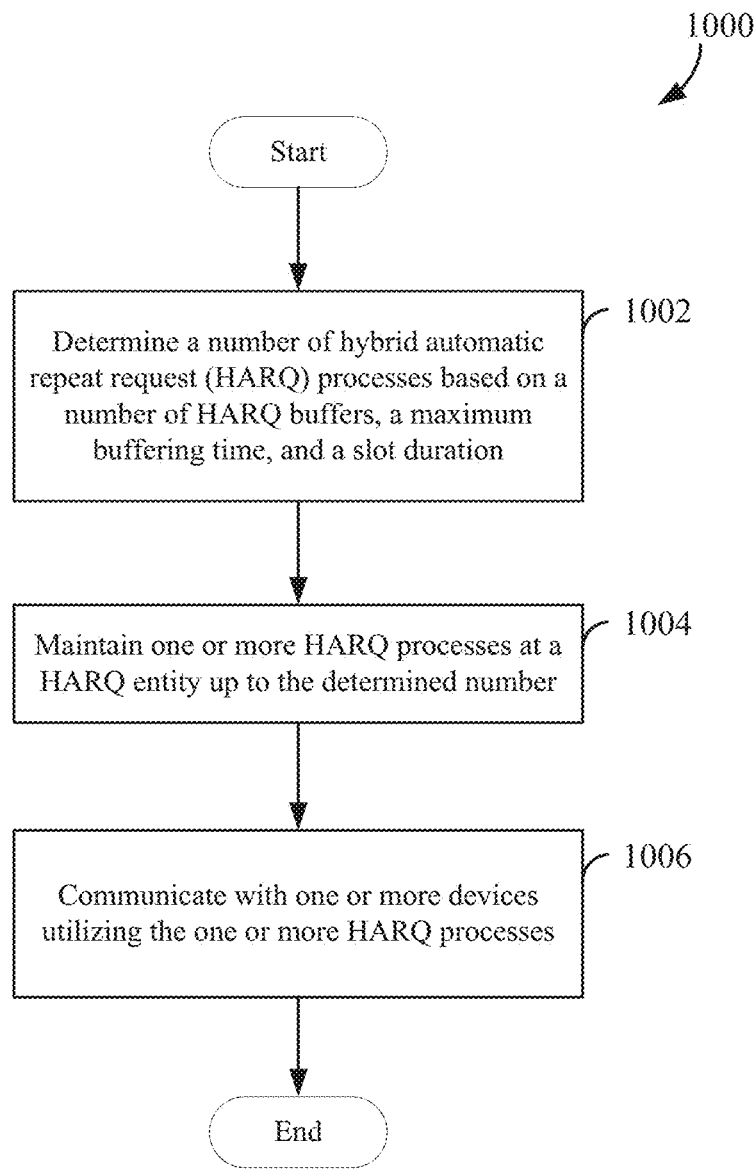
FIG. 10 is a flow chart illustrating an exemplary process for wireless communication utilizing HARQ according to some aspects of the present disclosure.

FIG. 10 is a flow chart illustrating an exemplary process 1000 for wireless communication utilizing HARQ according to some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 400 of FIG. 4 or scheduled entity 500 of FIG. 5. In some examples, the process 1000 may be carried out by any suitable apparatus or means for carrying out the functions or algorithm described below.

At block 1002, an apparatus (e.g., a scheduling entity or UE) may utilize a HARQ block 442 or 542 to determine a determined number of HARQ processes based on the number of available HARQ buffers 407 or 507, a maximum buffering time, and a slot duration. For example, the determined number of HARQ processes may be the maximum or optimal number of HARQ processes that may be utilized for wireless communication between a scheduling entity 400 and a scheduled entity 500. As described above, if the transmission is in slot N, the HARQ response (e.g., ACK/NACK) may be transmitted in the same slot or one or more slots after slot N. At block 1004, the apparatus maintains one or more HARQ processes at a HARQ entity 800 up to the determined number. At block 1006, the apparatus may utilize the communication block 440 or 540 and transceiver 410 or 510 to communicate with one or more devices utilizing the one or more HARQ processes.

In some aspects of the disclosure, the apparatus may communicate with the one or more devices utilizing different HARQ buffering times. In one example, the apparatus may use a first HARQ buffering time to communicate with a first device such that the apparatus can receive a HARQ response from the first device in the same slot. In another example, the apparatus may use a second HARQ buffering time to communicate with a second device such that the apparatus can receive a HARQ response from the second device in a different slot. In some aspects of the disclosure, the apparatus may communicate with the one or more devices utilizing different numerologies.

Figure 11:
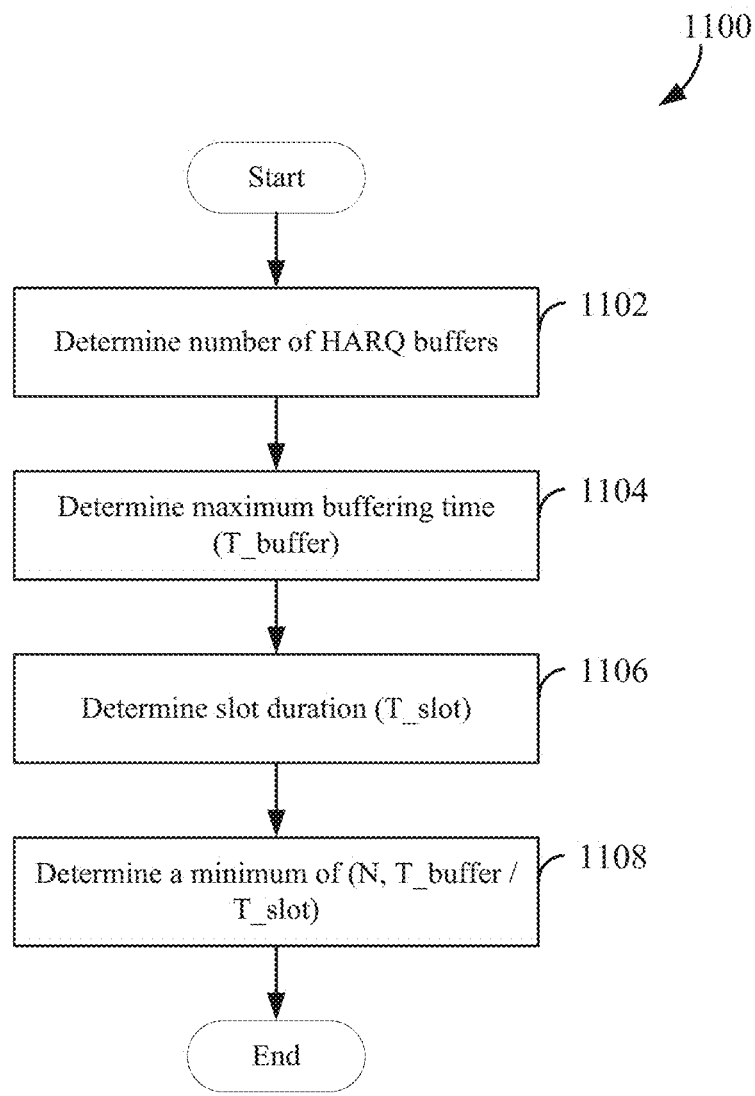
FIG. 11 is a flow chart illustrating an exemplary process for determining the number of HARQ processes maintained by a HARQ entity according to some aspects of the present disclosure.

FIG. 11 is a flow chart illustrating an exemplary process 1100 for determining the number of HARQ processes maintained at a HARQ entity 800 according to some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 400 of FIG. 4 or scheduled entity 500 of FIG. 5. In some examples, the process 1100 may be carried out by any suitable apparatus or means for carrying out the functions or algorithm described below.

At block 1102, an apparatus may utilize the HARQ block 442 or 542 to determine a number (N) of HARQ buffers 407 or 507 available for HARQ processes. In some examples, the number N may be determined based on the resources (e.g., memory) available at the transmitter and/or receiver.

At block 1104, the apparatus may utilize the HARQ block 442 or 542 to determine a maximum buffering time (T_buffer). In some examples, the buffering time may be determined based on latency requirement and/or bandwidth of the communication. The maximum buffering time refers to the time limit that data may be buffered in the HARQ buffer while meeting the communication requirement (e.g., latency). At block 1106, the apparatus determines a slot duration (T_slot) of wireless communication. The slot duration may be specified by the current numerology used at the apparatus. At block 1108, the apparatus may utilize the HARQ block 442 or 542 to determine a minimum of N and T_buffer/T_slot. This minimum value may be equal to the maximum number of HARQ processes that a HARQ entity may use during communication with another device.

In one configuration, the scheduling entity 400 and/or scheduled entity 500 for wireless communication includes means configured to perform the functions recited above. Of course, in the above examples, the circuitry and blocks included in the processor 404 and/or 504 are merely provided as an example, and other means for carrying out the described functions may be included within various aspects of the present disclosure, including but not limited to the instructions stored in the computer-readable storage medium 406 and 506, or any other suitable apparatus or means described in any one of the FIGS. 1, 2, 4, and 5, and utilizing, for example, the processes and/or algorithms described herein in relation to FIGS. 6-11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    determining a number of hybrid automatic repeat request (HARQ) processes based on a number of HARQ buffers, a maximum buffering time, and a time slot duration;
    maintaining one or more HARQ processes at a HARQ entity up to the determined number; and
    communicating with one or more devices utilizing the one or more HARQ processes.

2. The method of claim 1, wherein the determining comprises:
    determining the number of HARQ processes that avoids buffer overflow of the HARQ buffers by:

determining N, wherein N is the number of HARQ buffers;

determining T_buffer/T_slot, wherein T_buffer is the maximum buffering time and T_slot is the slot duration; and determining the determined number of HARQ processes as a minimum of (N, T_buffer/T_slot).

3. The method of claim 2, wherein N is a maximum number of HARQ buffers.

4. The method of claim 2, wherein the determined number of HARQ processes comprises a maximum number of HARQ processes utilized for wireless communication with the one or more devices.

5. The method of claim 1, wherein the determining further comprises:

determining the number of HARQ processes based on a HARQ response timing of the one or more devices.

6. The method of claim 1, wherein the determining further comprises:

determining the number of HARQ processes based on at least one of a subcarrier spacing or a cyclic prefix overhead used by the one or more devices.

7. An apparatus comprising:

a communication interface configured for wireless communication with one or more devices;

a memory; and a processor operatively coupled to the communication interface and memory, wherein the processor and memory are configured to:

determine a number of hybrid automatic repeat request (HARQ) processes based on a number of HARQ buffers, a maximum buffering time, and a time slot duration;

maintain one or more HARQ processes at a HARQ entity up to the determined number; and communicate with the one or more devices utilizing the one or more HARQ processes.

8. The apparatus of claim 6, wherein the processor and memory are further configured to determine the number of HARQ processes that avoids buffer overflow of the HARQ buffers by:

determining N, wherein N is the number of HARQ buffers;

determining T_buffer/T_slot, wherein T_buffer is the maximum buffering time and T_slot is the slot duration; and determining the determined number of HARQ processes as a minimum of (N, T_buffer/T_slot).

9. The apparatus of claim 8, wherein N is a maximum number of HARQ buffers.

10. The apparatus of claim 8, wherein the determined number of HARQ processes comprises:

a maximum number of HARQ processes utilized for wireless communication with the one or more devices.

11. The apparatus of claim 8, wherein the processor and memory are further configured to:

determine the number of HARQ processes based on a HARQ response timing of the one or more devices.

12. The apparatus of claim 8, wherein the processor and memory are further configured to:

determine the number of HARQ processes based on at least one of a subcarrier spacing or a cyclic prefix overhead used by the one or more devices.

13. An apparatus for wireless communication, comprising:

means for determining a number of hybrid automatic repeat request (HARQ) processes based on a number of HARQ buffers, a maximum buffering time, and a time slot duration;

means for maintaining one or more HARQ processes at a HARQ entity up to the determined number; and means for communicating with one or more devices utilizing the one or more HARQ processes.

14. The apparatus of claim 13, wherein the means for determining is configured to determine the number of HARQ processes that avoids buffer overflow of the HARQ buffers by:

determining N, wherein N is the number of HARQ buffers;

determining T_buffer/T_slot, wherein T_buffer is the maximum buffering time and T_slot is the slot duration; and determining the determined number of HARQ processes as a minimum of (N, T_buffer/T_slot).

15. The apparatus of claim 14, wherein N is a maximum number of HARQ buffers.

16. The apparatus of claim 14, wherein the determined number of HARQ processes comprises:

a maximum number of HARQ processes utilized for wireless communication with the one or more devices.

17. The apparatus of claim 13, wherein the means for determining further comprises:

means for determining the number of HARQ processes based on a HARQ response timing of the one or more devices.

18. The apparatus of claim 13, wherein the means for determining further comprises:

means for determining the number of HARQ processes based on at least one of a subcarrier spacing or a cyclic prefix overhead used by the one or more devices.

19. A non-transitory computer-readable storage medium comprising computer-executable code for causing an apparatus to:

determine a determined number of hybrid automatic repeat request (HARQ) processes based on a number of HARQ buffers, a maximum buffering time, and a time slot duration;

maintain one or more HARQ processes at a HARQ entity up to the determined number; and communicate with one or more devices utilizing the one or more HARQ processes.

20. The non-transitory computer-readable storage medium of claim 19, further comprising computer-executable code for causing the apparatus to determine the number of HARQ processes that avoids buffer overflow of the HARQ buffers by:

determining N, wherein N is the number of HARQ buffers;

determining T_buffer/T_slot, wherein T_buffer is the maximum buffering time and T_slot is the slot duration; and determining the determined number of HARQ processes as a minimum of (N, T_buffer/T_slot).

21. The non-transitory computer-readable storage medium of claim 20, wherein N is a maximum number of HARQ buffers.

22. The non-transitory computer-readable storage medium of claim 20, wherein the determined number of HARQ processes comprises:

a maximum number of HARQ processes utilized for wireless communication with the one or more devices.

23. The non-transitory computer-readable storage medium of claim 19, further comprising computer-executable code for causing the apparatus to:
   determine the number of HARQ processes based on a HARQ response timing of the one or more devices.

24. The non-transitory computer-readable storage medium of claim 19, further comprising computer-executable code for causing the apparatus to:
   determine the number of HARQ processes based on at least one of a subcarrier spacing or a cyclic prefix overhead used by the one or more devices.

* * * * *